(12) United States Patent
Doyle et al.

(10) Patent No.: US 11,034,318 B2
(45) Date of Patent: Jun. 15, 2021

(54) SAFETY SYSTEM INITIATOR WITH ELECTRONICALLY ADJUSTABLE FIRE TIME

(71) Applicant: B/E Aerospace, Inc., Winston-Salem, NC (US)

(72) Inventors: Adam M. Doyle, Winston-Salem, NC (US); Russell C. Proctor, Advance, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 85 days.

(21) Appl. No.: 16/431,286

(22) Filed: Jun. 4, 2019

(65) Prior Publication Data
US 2020/0384935 A1    Dec. 10, 2020

(51) Int. Cl.
| | |
|---|---|
| *B60R 21/0132* | (2006.01) |
| *B60R 21/017* | (2006.01) |
| *B64D 11/06* | (2006.01) |
| *B60R 21/00* | (2006.01) |
| *B60R 21/01* | (2006.01) |

(52) U.S. Cl.
CPC ........ *B60R 21/0132* (2013.01); *B60R 21/017* (2013.01); *B60R 2021/0093* (2013.01); *B60R 2021/01075* (2013.01); *B60R 2021/01109* (2013.01); *B60R 2021/01211* (2013.01); *B60R 2021/01327* (2013.01); *B64D 11/062* (2014.12); *B64D 11/0621* (2014.12)

(58) Field of Classification Search
CPC .. B60R 2021/0093; B60R 2021/01034; B60R 2021/01075; B60R 2021/01109; B60R 2021/01211; B60R 2021/01231; B60R 2021/01265; B60R 2021/01272; B60R 2021/01325; B60R 2021/01327; B60R 21/0132; B60R 21/017; B64D 11/062; B64D 11/0621
See application file for complete search history.

(56) References Cited

U.S. PATENT DOCUMENTS

| | | | | |
|---|---|---|---|---|
| 4,243,248 A | * | 1/1981 | Scholz | B60R 21/0132 280/735 |
| 4,477,732 A | * | 10/1984 | Mausner | G01P 15/093 307/9.1 |
| 4,984,464 A | * | 1/1991 | Thomas | B60R 21/0132 307/10.1 |

(Continued)

*Primary Examiner* — Laura Freedman
(74) *Attorney, Agent, or Firm* — Suiter Swantz pc llo

(57) ABSTRACT

In a triggering system for activating a safety device, an acceleration sensor outputs a signal for a time duration in which an acceleration impulse exceeds an acceleration magnitude threshold. A first switching device receives the signal output by the acceleration sensor, and electrically connects a power supply to at least one safety response device for the time duration. A time delay device, upon completion of a delay time after receiving the signal output by the acceleration sensor, outputs a signal for the time duration. A second switching device receives the signal output by the time delay device, and electrically connects the power supply to the at least one safety response device for the time duration. When the time duration exceeds the delay time, the first switching device and the second switching device concurrently electrically connect the safety response device to the power supply, activating the safety response device.

19 Claims, 2 Drawing Sheets

(56) References Cited

U.S. PATENT DOCUMENTS

| | | | | |
|---|---|---|---|---|
| 5,034,891 A * | 7/1991 | Blackburn | .......... | B60R 21/0133 |
| | | | | 701/47 |
| 5,040,118 A * | 8/1991 | Diller | .................. | B60R 21/0133 |
| | | | | 701/45 |
| 5,418,722 A * | 5/1995 | Cashler | ............... | B60R 21/0132 |
| | | | | 180/282 |
| 5,483,451 A * | 1/1996 | Ohmae | ............... | B60R 21/0133 |
| | | | | 180/282 |
| 5,521,822 A * | 5/1996 | Wang | .................. | B60R 21/0132 |
| | | | | 180/282 |
| 5,732,374 A * | 3/1998 | Ohm | ..................... | B60R 21/013 |
| | | | | 701/45 |
| 6,219,606 B1 * | 4/2001 | Wessels | ................ | B60R 21/013 |
| | | | | 180/271 |
| 6,299,102 B2 * | 10/2001 | Happ | .................... | B60R 21/013 |
| | | | | 244/122 AG |
| 10,040,572 B2 * | 8/2018 | Santana-Gallego | ... | B64D 45/00 |
| 10,391,960 B2 * | 8/2019 | Settles | .................... | B64D 45/00 |
| 10,414,501 B2 * | 9/2019 | Thompson | ........... | B64D 11/064 |
| 2018/0208141 A1 * | 7/2018 | Mase | .................. | B60R 21/0134 |

* cited by examiner

SAFETY SYSTEM INITIATOR WITH ELECTRONICALLY ADJUSTABLE FIRE TIME

BACKGROUND

Vehicles such as aircraft include safety response devices that actively respond to critical events such as acceleration impulses to provide or assist passenger or equipment security and safety. Typical safety response devices include airbags, backrest breakover mechanism, belt pretensioners, etc. Many safety response devices, such as airbags, are one-time-use devices, and their deployment is disruptive to passengers and expensive to replace to travel services operators such as airline companies. As such, needless activation of safety response devices is to be avoided.

For example, an airbag may be deployed when an acceleration threshold magnitude is exceeded. However, acceleration impulses of very short duration may require no response. Such spurious impulses may be caused by passengers slamming stowage compartment doors or impacting seats with luggage as they enter and exit a passenger seating area.

Different types of safety devices and varying installations of safety devices call for flexibility in a triggering system. Particularly, time characteristics of spurious acceleration events are to be discriminated and critical inertial events, for which a response is needed, need to be discerned.

Accordingly, what is needed is a triggering system for appropriately activating at least one safety response device

SUMMARY OF THE INVENTIVE ASPECTS

To achieve the foregoing and other advantages, the inventive aspects disclosed herein are directed to a triggering system for activating at least one safety response device. At least one acceleration sensor is operative to output a signal for a time duration in which an acceleration impulse exceeds an acceleration magnitude threshold. A first switching device electrically connected to the acceleration sensor is operative to, upon receiving the signal output by the acceleration sensor, electrically connect a power supply to at least one safety response device for the time duration. A time delay device electrically connected to the acceleration sensor, the time delay device is operative to, upon completion of a delay time after receiving the signal output by the acceleration sensor, output a signal for the time duration. A second switching device electrically connected to the time delay device is operative to, upon receiving the signal output by the time delay device, electrically connect the power supply to the at least one safety response device for the time duration. When the time duration exceeds the delay time, the first switching device and the second switching device concurrently electrically connect the safety response device to the power supply, thereby activating the safety response device.

In some embodiments, the time delay is adjustable.

In some embodiments, a second acceleration sensor electrically is connected in series to the at least one acceleration sensor. The sensors are operative together to output the signal for the time duration in which an acceleration impulse exceeds concurrently a respective acceleration magnitude threshold of each sensor.

In some embodiments, multiple safety response devices include the at least one safety response device.

In some embodiments, the second switching device includes multiple switches in specific correspondence and respective electrical communication with the safety response devices.

In some embodiments, the multiple switches are switched from non-conducting conditions to conducting conditions when the second switching device receives the signal output by the time delay device.

In some embodiments, an indicator electrically connected to the first and second switching devices is operative to indicate at least one status.

In some embodiments, the power supply includes a battery, and the trigger system consumes essentially no power from the battery in a standby mode in which no acceleration impulse exceeds the acceleration magnitude threshold.

In some embodiments, the acceleration sensor is generally maintained in a non-conducting condition, and achieves a conducting condition when actuated by an acceleration impulse exceeds the acceleration magnitude threshold.

In some embodiments, the acceleration sensor returns to the non-conducting condition when the acceleration impulse reduces below the acceleration magnitude threshold.

In some embodiments, the safety response device includes an electrically ignited pyrotechnic charge.

In some embodiments, the safety response device includes an airbag inflated when activated.

In some embodiments, the safety response device includes a pretensioner that rapidly retracts a shoulder belt when activated.

In some embodiments, the safety response device includes a breakover mechanism for the backrest of a passenger seat assembly to permit or provide breakover when activated.

In another aspect, the inventive concepts disclosed herein are directed to a method of activating at least one safety-response device. The method includes: activating at least one acceleration sensor; detecting, by the at least one acceleration sensor, an acceleration impulse; initiating, upon detecting the acceleration impulse, a time delay; determining, upon expiration of the time delay, whether the acceleration impulse is still detected; and triggering at least one safety response device upon determining that the acceleration impulse is still detected upon expiration of the time delay.

In some embodiments, detecting, by the at least one acceleration sensor, an acceleration impulse includes passing a signal through at least two acceleration sensors in series connection.

In some embodiments, determining whether the acceleration impulse is still detected includes: sending an undelayed output of the acceleration sensor to a first switching device; sending a delayed output of the acceleration sensor to a second switching device; and determining whether the undelayed and delayed outputs of the acceleration sensor are concurrent at the first switching device and second switching device.

In some embodiments, determining whether the acceleration impulse is still detected includes determining a duration of the acceleration impulse is greater than the time delay.

In some embodiments, detecting, by the at least one acceleration sensor, an acceleration impulse, includes the acceleration sensor being actuated from a non-conducting condition to a conducting condition by acceleration greater than a predetermined magnitude threshold.

In some embodiments, triggering at least one safety response device includes triggering an airbag to inflate.

In some embodiments, triggering at least one safety response device causes an electrically ignited pyrotechnic charge to fire.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTIONS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Circuits, devices, systems, and methods are described in the following for adjustably delaying the response of one or more safety devices following a potential triggering event such as the receipt of a signal from a sensor. Time delays are predetermined to prevent the triggering of safety response devices when momentary false or spurious sensor signals are received due to, for example, equipment vibrations, minor impacts or accelerations, and other undiagnosed events for which no safety device response is needed. The described can be utilized to compensate for timing differences among various types of sensors and safety response devices, permitting for example to a triggering system to be used with a variety of sensor types and in a variety of applications. Where the actions of sensors and safety response devices have individualized timing characteristics, for example within a respective tolerance as specified by a manufacturer or as determined by empirical testing, those actions can be coordinated using an adjustable delay to avoid falsely triggering safety systems and to assure properly timed response sequences when safety systems are triggered by critical conditions such as inertial events, referring to occurrences of relatively high acceleration.

Figure 1:
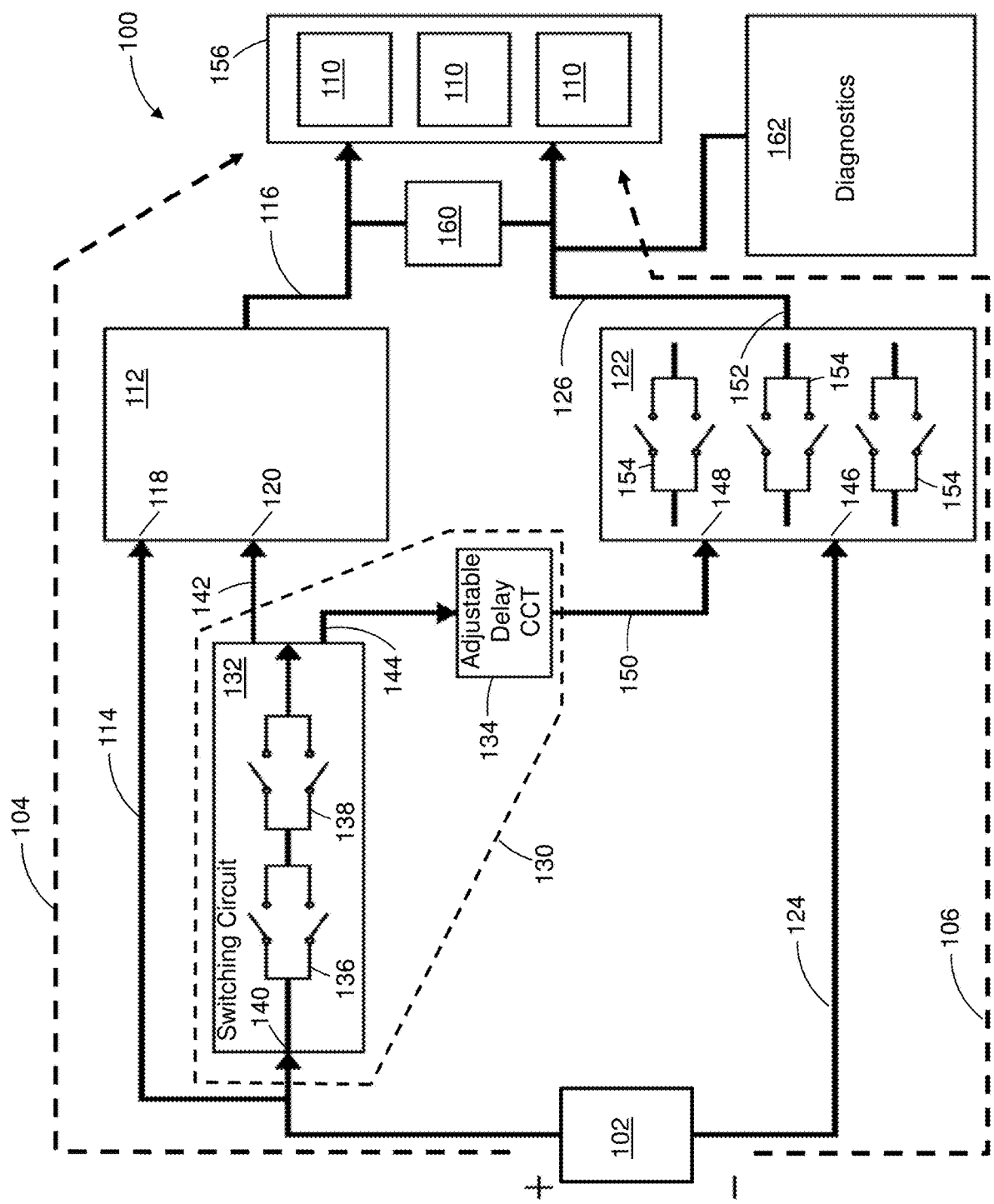
FIG. 1 is a circuit diagram representing a triggering system, according to the present disclosure, operable for activating one or more safety-response devices when a critical inertial event is determined.

FIG. 1 depicts a circuit diagram representing a safety-response triggering system 100, according to the present disclosure, operable for activating one or more safety response devices when an acceleration impulse meets or exceeds a predetermined magnitude threshold for at least an adjustable duration threshold. The triggering system 100 can respond to a critical inertial event according to the magnitude and duration thresholds while discriminating against acceleration impulses having either lesser magnitudes or durations. The triggering system 100 includes one or more safety response devices that are triggered by receipt of a voltage differential provided by a DC power supply 102, such as a battery. Two conducting paths along which an electrical connection from the power supply to the safety response devices are represented in FIG. 1 as needed for a closed DC circuit to be selectively completed. A first path is referenced as a high-side path 104 and a second path is referenced as a low-side path 106, which are termed according respectively to electropositive (+) and electronegative (−) relative DC voltage levels of the electrical power supply. Variations within the scope of these descriptions include examples in which the relative DC voltage levels are reversed.

Furthermore, these descriptions refer to the DC power supply 102 side of the triggering system 100 as generally upstream and the safety response devices 110 as generally downstream without necessarily referring to electrical current flow directions, which are typically defined as opposite the direction of electron flow in a circuit or conductor segment. In that sense, the high-side path 104 and low-side path 106 have respective upstream and downstream portions delineated by switching devices that selectively propagate voltage "signals" from the power supply 102 downstream to the safety response devices 110.

It should also be understood that physical implementations of safety-response triggering systems according to FIG. 1 and descriptions thereof herein need not appear as in the drawing with regard to placement of real components. Those of ordinary skill in the art recognize that equivalent circuits according to a circuit diagram can vary in physical geometry and construction. In particular, upstream to downstream connectivity or propagation appears generally left-to-right in FIG. 1 for illustration purposes without implication on physical implementations of safety-response triggering systems according thereto.

Additionally, the term signal is broadly used herein to refer to connectivity as in closed circuit conditions for voltage propagation and current flow. In that sense, for example, a battery can be described as providing a signal to a switch, and when the switch is in a conducting condition, the switch propagates the signal from the battery to downstream devices.

In FIG. 1, a first or high-side switching device 112 between the DC power supply 102 and the safety response devices selectively electrically connects an upstream portion 114 of the high-side path 104 to a downstream portion 116 of the high-side path 104. Similarly, a second or low-side switching device 122 between the DC power supply 102 and the safety response devices 110 selectively electrically connects an upstream portion 124 of the low-side path 106 to a downstream portion 126 of the low-side path 106. Circuit completion to trigger the safety response devices 110 occurs when continuity or connection is made simultaneously through the low-side switching device 122 and high-side switching device 112 thereby applying a voltage differential to the safety response devices 110.

A switch control subsystem 130, which includes an inertial switch circuit 132 and a delay device 134, controls the connectivity status of the high-side and low-side switching devices 112 and 122. Upstream of the switching devices, the inertial switch circuit 132 includes at least one sensor, such as an acceleration sensor operative to detect an acceleration impulse. Two sensors are illustrated and referenced as a first sensor 136 and a second sensor 138 representing that any number of sensors can be included. The two sensors 136 and 138 are illustrated arranged in an electrical series connection or relation to each other to provide the assurance of redundancy in any connectivity or signal conveyed by the inertial switch circuit 132. The inertial switching circuit 132 can include the sensors and drive circuitry according to the type of sensors used.

The sensors 136 and 138 are operative to detect changes in velocity of structures to which the sensors are connected or coupled, such as the components of passenger seats, the structures in an aircraft passenger cabin, or other structures of the aircraft overall such as fuselage and frame elements. The sensors are operative to detect high G-force events and may include any combination of multi-axis accelerometers, gyroscopes, and magnetometers, among others. In some implementations, accelerometers may be configured measure an amount of acceleration in a particular direction, gyroscopes may be configured to measure changes in orientation or relative velocity, and magnetometers measure changes in magnetic fields that can be used to determine absolute orientation of the elements to which the magnetometers are connected. Because accelerometers, gyroscopes, and magnetometers may be used to measure different features of inertial movement, the sensor outputs may be combined into or may otherwise contribute to connectivity or an output emitted or generated by the inertial switch circuit 132.

In a particular conceived example, the first and second sensors 136 and 138 are ball and spring type acceleration switches that are generally maintained in a non-conducting condition in which a spring biases a ball from a conducting position. Such switches achieve electrically conducting conditions when actuated by acceleration greater than a predetermined magnitude threshold and return to non-conducting condition when the acceleration reduces below the threshold. The magnitude threshold of each such sensor can be predetermined, for example, by the spring constant of the spring and by the geometry of the device. In such a device, the ball, serving as an inertial mass, moves against the force of the spring to a conducting position to provide connectivity by either direct conduction through the ball or by otherwise engaging or actuating a switch with the ball during an inertial event. Thus, the magnitude threshold can be predetermined by selection of the acceleration sensors used or by adjustment of an acceleration sensors. The benefit of the series connection of two or more sensors that respond to an inertial incident is that a signal or connectivity is passed through the series connection only when all sensors in the signal path are in a conducting condition concurrently responding to an acceleration event.

An upstream input 140 of the inertial switch circuit 132 is electrically connected to the DC power supply 102 by way of the upstream portion 114 of the high-side path 104. Upon actuation of all series connected sensors in the inertial switch circuit 132, connectivity from the input to the outputs of the inertial switch circuit 132 is provided by the inertial switch circuit 132. A first output 142 of the inertial switch circuit 132 is routed or connected to the high-side switching device 112. A second output 144 of the inertial switch circuit 132 is routed or connected to the adjustable delay device 134, and, downstream of the delay device 134, to the low-side switching device 122.

An upstream first input 146 of the low-side switching device 122 is electrically connected to the DC power supply 102 by the upstream portion of the low-side path 106. A second input 148 of the low-side switching device 122 is electrically connected to the output 150 of the delay device 134. An output of the low-side switching device 122 is routed to the downstream safety response devices 110 by the downstream portion 126 of the low-side path 106. The low-side switching device 122 is represented in FIG. 1 as having multiple gated switches 154, each of which is in specific correspondence and respective electrical communication with a downstream safety response device 110. The gated switches 154 are generally maintained in non-conducting conditions, and are switched to conducting conditions upon receipt of connectivity or signal at the second input from second output of the inertial switch circuit 132 by way of the delay device 134. The gated switches 154 can be, for example, field-effect transistors (FETs) gated by the output 150 of the delay device 134.

The downstream portion 126 of the low-side path 106 can be a single conductance path as expressly illustrated in FIG. 1, or, in various embodiments, can include numerous channels in one-to-one correspondence with the individual safety response devices 110 or predetermined groups thereof. Similarly, the downstream portion 116 of the high-side path 104 can be a single conductance path as expressly illustrated in FIG. 1, or, in various embodiments, can include numerous channels in one-to-one correspondence with the individual safety response devices 110 or predetermined groups thereof.

An upstream first input 118 of the high-side switching device 112 is electrically connected to the DC power supply 102 by the upstream portion 114 of the high-side path 104. A second input 120 of the high-side switching device 112 is electrically connected to the first output 142 of the inertial switch circuit 132. An output of the high-side switching device 112 is routed to the downstream safety response devices 110 by the downstream portion 116 of the high-side path 104. The high-side switching device 112 is generally maintained in a non-conducting condition between the upstream portion 114 and downstream portion 116 of the high-side path 104. However, upon receipt of connectivity or signal from the first output 142 of the inertial switch circuit 132, the high-side switching device 112 is switched to a conducting condition.

The high-side switching device 112, in at least one embodiment similar to the low-side switching device 122, has multiple gated switches, each of which is in specific correspondence and electrical communication with a downstream safety response device 110. Other embodiments of at least the high-side switching device 112 are within the scope of these descriptions. In any embodiment, switchable connectivity from the power supply device 102 to each safety response device 110 is provided along the high-side path 104 by the high-side switching device 112 under control of the switch control subsystem 130, and along the low-side path 106 by the low-side switching device 122 under control of the switch control subsystem. Advantageous individually switched control of each safety response device 110 can be provided by both or either one of the low-side switching device 122 and high-side switching device 112. In the illustrated embodiment of the safety-response triggering system 100, the low-side switching device 122 is expressly illustrated as having multiple gated switches 154 in one-to-one correspondence and electrical communication with the safety response devices 110 to represent that at least the low-side switching device 122 provides the advantageous individual switched control of each safety response device or groupings thereof.

The delay device 134 generally receives a signal from the second output 150 of the inertial switch circuit 132 and subsequently, at the expiration of a time delay, propagates the signal, or sends a corresponding generated signal, to the low-side switching device 122 prompting a conducting condition from the upstream portion 124 to the downstream portion 126 of the low-side path 106. The counting of the time delay is initiated upon receipt of the signal from the inertial switch circuit 132. The time delay has an adjustable duration. Thus, the signals sent by the delay device 134 to the low-side switching device 122 lag the signals received from the inertial switch circuit 132 by the adjustable time delay. The time delay can be adjusted, for example, by modifying the values of resistors during post production testing to assure a desired predetermined time delay in accordance with the particular safety response devices 110 used and how they are to be utilized.

The safety response devices 110 are activated or triggered when the low-side switching device 122 and high-side switching device 112 are concurrently in conducting condition, permitting connectivity concurrently along the high-side path 104 and low-side path 106. This defines a completed circuit from the power supply 102 to the safety response devices 110, applying a voltage differential to the safety response devices 110 thereby activating the safety response devices 110. The delay device 134 introduces a time delay in the second input 148 of the low-side switching device 122 relative to the second input 120 of the high-side switching device 112 to prevent the triggering of safety response devices 110 in the event of momentary false or spurious signals at the outputs of the inertial switch circuit 132. Any connectivity or signal initiated at the inertial switch circuit 132 having a duration less than the time delay introduced by the delay device 134 will result in non-concurrent signals at the second inputs of the low-side and high-side switching devices due to expiration of the signal at the high-side switching device 112 before expiration of the time delay, preventing the safety response devices 110 from activating.

The multiple safety response devices 110 may be triggered at once or in a desired sequence individually or in groups thereof. The safety response devices 110 as illustrated in an array 156 in FIG. 1 to represent that any number of safety response devices can be used. The safety response devices 110 can be devices of any type that responds to respective triggering signals with active responses that provide or assist passenger or equipment security and safety. For example, the safety response devices 110 can include pyrotechnic actuators, which are termed squibs in some industries, and thus may include, among other components, an electrically ignited pyrotechnic charge. Small pyrotechnic actuators can typically exert significant force (tens or hundreds of pounds) and achieve actuation speeds as low as several milliseconds. The safety response devices 110 can be or can include other types of actuators, such as linear solenoids. A linear solenoid can exert a significant force in a short time period responding an applied current, and can be used repeatedly without replacement in some implementations.

The safety response devices 110 may be breakover mechanisms for the backrests of passenger seat assemblies to permit or provide breakover when an inertial event causes a passenger to lunge toward or impact a seatback from behind. Forward breakover movement of the seatback preceding or in response to a passenger impact may dissipate energy and reduce injuries. See, for example, US patent application publication US 2018/0346125 A1, entitled "Seat Back Breakover with Dynamically Triggered Actuator," published Dec. 6, 2018, which is incorporated herein, for further detailed information regarding breakover mechanisms, acceleration sensor, drive circuitries, and actuators used with or implemented upon aircraft passenger seats.

The safety response devices 110 may be active pretensioners that rapidly retract shoulder belts, in the event of a sudden deceleration of an aircraft, to substantially remove slack between a passenger and the shoulder belt. See, for example, US patent application publication US 2017/0283079 A1, entitled "Pretensioner for Retractable Shoulder Belt and Seat Belt," published Oct. 5, 2017, which is incorporated herein, for further detailed information regarding pretensioners.

In a particularly conceived example, the safety response devices 110 are airbag devices including squibs that produce gas pressure or release previously pressurized gas to inflate airbags. The airbag devices may be used in vehicles such as aircraft. Airbags may be deployed from one or more passenger seat assemblies, structures in a passenger cabin environment, or one or more components of a single seat assembly. Airbags may be deployed forward of a passenger and along both lateral sides. Multiple airbag devices represented by the safety response devices 110 shown in FIG. 1 may be inflated all at once, or in a predetermined sequence. In at least one embodiment, each separately shown safety response device 110 is a squib for redundancy in assuring deployment of a single airbag or other squib-activated safety device.

An indicator 160 may be provided, as shown in FIG. 1, to alert or inform a user, installer, or maintenance technician as to the operational status of the safety-response triggering system 100 and/or individual safety response devices 110 for example. The indicator 160 may for example include light emitters such as LEDs in one-to-one correspondence with the safety response devices 110 to visibly indicate the status of each device. In FIG. 1, the indicator 160 is shown electrically connected by respective connectors to the downstream portions 126 and 116 of the low-side path 106 and high-side path 104, upstream of and in parallel relation to the safety response device array 156.

A diagnostics subsystem 162 can also be provided, as represented in FIG. 1, as an on-board or remote system. The diagnostic subsystem 162 can display, record, relay, and/or analyze the same information provided by the indicator 160 and additional information as well. The diagnostics subsystem 162 is shown as connected to the downstream portion 126 of the low-side path 106 upstream of the safety response device array 156. In other embodiments, the diagnostics subsystem 162 is in further communication with other components of the triggering system 100 so as to permit utilization of status information on other or all other components. This may be particularly advantageous to permit analysis of events associated with any triggering of one or more of the safety response devices 110 and to permit analysis of any events in which triggering did not occur properly.

By adjustment of the time delay introduced by the delay device 134, the triggering system 100 can be used in various applications and with various safety response device types, all with differing time requirements. Also, various types of acceleration switches can be used in the inertial switching circuit 132 and their varying time response functions, by which spurious events are to be discriminated to prevent unwanted safety response device activation, can be accommodated by adjustment of the time delay. The adjustable time delay defines a duration threshold, predetermined by adjustment, by which a critical inertial event is determined and by which acceleration impulses of lesser duration are discriminated. Any connectivity or signal initiated at the inertial switch circuit 132 having a duration less than the time delay will result in non-concurrent signals at the switching devices, preventing the safety response devices 110 from activating. The triggering system 100 provides an alternative and safer approach relative to firing an airbag, for example, at a threshold acceleration magnitude regardless of duration.

The inertial switch circuit 132 discriminates against acceleration impulses below a predetermined magnitude threshold. The time delay device 134, cooperatively with the low-side switching device 122 and high-side switching device 112, discriminates against acceleration impulses that are shorter-lived than an adjustable duration threshold. Thus, the safety-response devices 110 are activated only when a critical inertial event is determined according to the magnitude and duration thresholds, while discriminating against lesser magnitude and duration acceleration impulses. The triggering system 100 therefore effectively filters outs short time vibrations caused by minor incidental impacts and other non-impact related accelerations while assuring the triggering system 100 responds to critical inertial events with a predetermined response by activating the safety response devices 110.

The triggering system as illustrated can advantageously be battery powered and consumes no power from the battery in standby mode, referring to quiescence in which no acceleration impulses exceed the magnitude thresholds of the acceleration sensors at the inertial switching circuit 132. The triggering system can thus have a long service life after installation assuming no or few critical inertial events occur.

Figure 2:
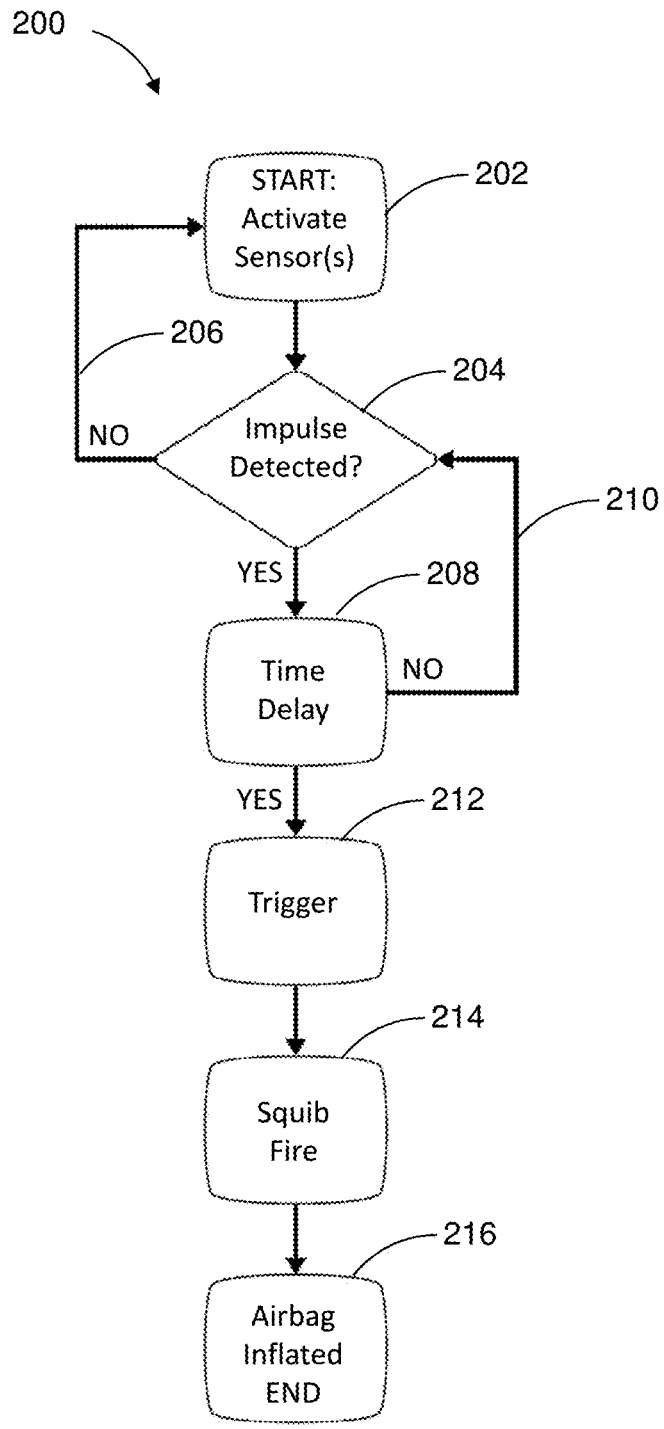
FIG. 2 is a flowchart representing a method, for example as implemented by the system of FIG. 1, for activating one or more safety-response devices when a critical inertial event is determined.

FIG. 2 represents a method 200 of activating a safety response device when an acceleration impulse meets or exceeds a predetermined magnitude threshold for at least an adjustable duration threshold. In the method 200, one or more safety-response devices are activated only when a critical inertial event is determined according to the magnitude and duration thresholds, while discriminating against lesser magnitude and duration acceleration impulses. The method 200 can be implemented, for example, by the system 100 of FIG. 1.

General activation of a safety system including at least one sensor and at least one safety response device is represented at step 202 as "START." Upon activation, at least one sensor is ready to detect a change in status. For example, where the sensor is an acceleration sensor, the sensor is ready at "START" to detect an acceleration impulse. A sensor 136 and/or 138 (FIG. 1) for example can be activated by electrical connection to the power supply 102 and downstream devices such as the high-side switching device 112 and delay device 134.

The method 200 is described herein with reference also to the system 100 of FIG. 1, by which the method 200 of FIG. 2 is implemented in at least one embodiment. Similarly, the method 200 represents a particularly conceived use of the system 100. While the system 100 and the method 200 are mutually applicable, neither is limited by the other in all embodiments within the scope of these descriptions.

With at least one sensor in an active sensing mode following step 202, whether an acceleration impulse is detected is determined in step 204. In the absence of a detected acceleration impulse, represented as a "NO" return branch 206 in FIG. 2, the method returns to "START." A quiescent condition or loop in which sensors are active but no impulse is detected is thus represented in FIG. 2 at steps 202 and 204, and the return branch 206. As implemented by the safety-response triggering system 100 of FIG. 1, this corresponds to a condition in which the low-side switching device 122 and high-side switching device 112 are in non-conducting conditions such that upstream and downstream portions of the low-side and high-side paths are disconnected at the switching devices. In such conditions, minor acceleration impulses may occur with magnitudes insufficient to actuate the sensors 136 and 138. However, the inertial switch circuit 132 discriminates against acceleration impulses below a predetermined magnitude threshold, corresponding effectively to the absence of a detected acceleration impulse and step 204, and a "NO" return branch 206 in FIG. 2.

In the presence of an acceleration impulse detected as determined at step 204, the method 200 continues, represented as a "YES" in FIG. 2, to a time delay step 208 representing the initiation of the count of a time delay. Determination of whether an acceleration impulse is detected may include discriminating against acceleration impulses below a predetermined magnitude threshold, and determining an acceleration impulse occurs when the magnitude threshold is met or exceeded.

For example, as implemented by the safety-response triggering system 100 of FIG. 1, this corresponds to connectivity or signals being provided to the delay device 134 and the high-side switching system 112 by the inertial switch circuit 132. Upon receipt of the signal at the second input 120, the high-side switching device 112 is switched from its generally maintained non-conducting condition to a conducting condition between the upstream portion 112 and downstream portion 116 of the high-side path 104. Thus, the safety response devices 110 lack only connectivity along the low-side path 106 for activation to occur. However, the counting of the time delay initiated at the time delay device 134 by receipt of the signal from the inertial switch circuit 132 has not completed, and therefore the gated switches of the low-side switching device 122 are maintained in non-conducting conditions.

Returning to FIG. 2, from the time delay step 208, prior to expiration of the time delay being counted, a "NO" return branch 210 returns the method to step 204 to persistently or repeatedly redetermine whether an acceleration impulse is detected. Thus, a timed condition or loop in which the time delay is being counted is thus represented in FIG. 2 at steps 204 and 208, and the return branch 210. In the exemplary implementation of FIG. 1, this corresponds to the counting of the delay time by the delay device 134 as the low-side switching system awaits the signal from the delay device 134.

If, in any iteration or time at step 204 (FIG. 2), no impulse is detected, represented as the "NO" branch 206 in FIG. 2, the method returns to "START." In the exemplary implementation of FIG. 1, this corresponds to a loss of signal at the second input of the high-side switching device 112 prior to expiration of the time delay at the time delay device 134. As the signal at the high-side switching device 112 subsides, the high-side switching device 112 returns to its generally maintained non-conducting condition between the upstream portion 112 and downstream portion of the high-side path 104. This represents a standing down of the triggering system 100 and safety response device array 156 as the count of the delay time at the delay device 134 completes or is terminated. In both FIGS. 1 and 2, this represents the discrimination against momentary or minor acceleration impulses and sensor signals, and filtering out short time vibrations caused by minor incidental impacts and other non-impact related accelerations without activating a safety response device.

Once the time delay initiated at the time delay step 208 (FIG. 2) is complete, and upon the condition that the acceleration impulse persists ("Impulse Detected"), the method 200 continues, represented as a "YES" in FIG. 2, to a triggering step 212. In the method 200, this represents a determination that the detected acceleration impulse is a critical inertial event for which a safety response device should be activated. As evidenced by the duration of the acceleration impulse meeting or exceeding the expiration of the delay time, a critical inertial event is discerned. Accordingly, a triggering signal, connection, action, or actuation occurs at triggering step 212.

In the exemplary implementation of FIG. 1, this corresponds to a continued connectivity or signal at the second input of the high-side switching device 112 as the delay time expires, such that the undelayed signal from the inertial switch circuit 132 at the high-side switching device 112 overlaps in time with the arrival of the delayed signal from the delay device 134 at the low-side switching device 122. Upon receipt of the signal at the second input thereof, the low-side switching device 122 is switched from its generally maintained non-conducting condition to a conducting condition. The low-side switching device 122 and high-side switching device 112 are therefore concurrently in conducting condition, permitting connectivity or signal concurrently along the high-side path 104 and low-side path 106, completing the circuit from the power supply 102 to the safety response devices 110, thereby applying a voltage differential to the safety response devices 110 and activating the safety response devices 110.

Returning to FIG. 2, from the triggering step 212, the method 200 continues to step 214 at which one or more safety response devices 110 are activated by the triggering. A predetermined response by, or condition of, the safety response follows as represented by step 216. For example, in an implementation of a breakover mechanism in a passenger seat, the triggering step 212 may correspond to sending power to a solenoid or other actuator that prompts or permits breakover action of a backrest, step 214 may correspond to movement by the solenoid or actuator, and step 216 may correspond to the backrest being in a condition for breakover or being in a breakover position.

In correspondence with the exemplary implementation of FIG. 1, step 214 corresponds to the actuation or release of an actuator by which an airbag is deployed, and step 216 corresponds to an airbag inflated and deployed. In the particularly conceived example, in which the safety response devices 110 are airbag devices including squibs, step 214 corresponds to the firing of the squibs and step 216 corresponds to inflation of the airbags by gas pressure produced or released by the firing of the squibs.

Thus, the method 200 activates a safety response device (steps 212-216) when an acceleration impulse meets or exceeds a predetermined magnitude threshold (step 204) for at least an adjustable duration threshold (step 208).

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A triggering system for activating at least one safety response device, comprising:
at least one acceleration sensor operative to output a signal for a time duration in which an acceleration impulse exceeds an acceleration magnitude threshold;
a first switching device electrically connected to the acceleration sensor, the first switching device operative to, upon receiving the signal output by the acceleration sensor, electrically connect a power supply to the at least one safety response device for the time duration;
a time delay device electrically connected to the acceleration sensor, the time delay device operative to, upon completion of a time delay after receiving the signal output by the acceleration sensor, output a signal for the time duration; and
a second switching device electrically connected to the time delay device, the second switching device operative to, upon receiving the signal output by the time delay device, electrically connect the power supply to the at least one safety response device for the time duration;
wherein, when the time duration exceeds the time delay, the first switching device and the second switching device concurrently electrically connect the safety response device to the power supply, thereby activating the safety response device.

2. The triggering system according to claim 1, wherein the time delay is adjustable.

3. The triggering system according to claim 1, further comprising a second acceleration sensor electrically connected in series to the at least one acceleration sensor, the sensors operative together to output the signal for the time duration in which the acceleration impulse exceeds concurrently a respective acceleration magnitude threshold of each sensor.

4. The triggering system according to claim 1, comprising multiple safety response devices including the at least one safety response device.

5. The triggering system according to claim 4, wherein the second switching device comprises multiple switches in specific correspondence and respective electrical communication with the safety response devices.

6. The triggering system according to claim 5, wherein the multiple switches are switched from non-conducting conditions to conducting conditions when the second switching device receives the signal output by the time delay device.

7. The triggering system according to claim 1, further comprising an indicator electrically connected to the first and second switching devices, the indicator operative to indicate at least one status.

8. The triggering system according to claim 1, wherein the power supply comprises a battery, and wherein the trigger system consumes essentially no power from the battery in a standby mode in which no acceleration impulse exceeds the acceleration magnitude threshold.

9. The triggering system according to claim 1, wherein the acceleration sensor is generally maintained in a non-conducting condition, and achieves a conducting condition when actuated by the acceleration impulse that exceeds the acceleration magnitude threshold.

10. The triggering system according to claim 9, wherein the acceleration sensor returns to the non-conducting condition when the acceleration impulse reduces below the acceleration magnitude threshold.

11. The triggering system according to claim 1, wherein the safety response device comprises an electrically ignited pyrotechnic charge.

12. The triggering system according to claim 1, wherein the safety response device comprises an airbag inflated when activated.

13. The triggering system according to claim 1, wherein the safety response device comprises a pretensioner that rapidly retracts a shoulder belt when activated.

14. The triggering system according to claim 1, wherein the safety response device comprises a breakover mechanism for a backrest of a passenger seat assembly to permit or provide breakover when activated.

15. A method of activating at least one safety response device, the method comprising the steps of:
   activating at least one acceleration sensor;
   detecting, by the at least one acceleration sensor, an acceleration impulse;
   initiating, upon detecting the acceleration impulse, a time delay;
   determining, upon expiration of the time delay, whether the acceleration impulse is still detected; and
   triggering the at least one safety response device upon determining that the acceleration impulse is still detected upon expiration of the time delay,
   wherein, the step of determining whether the acceleration impulse is still detected comprises the steps of:
   sending an undelayed output of the acceleration sensor to a first switching device;
   sending a delayed output of the acceleration sensor to a second switching device; and
   determining whether the undelayed and delayed outputs of the acceleration sensor are concurrent at the first switching device and the second switching device.

16. The method of claim 15, wherein the step of detecting, by the at least one acceleration sensor, the acceleration impulse comprises passing a signal through at least two acceleration sensors in series connection.

17. The method of claim 15, wherein the step of determining whether the acceleration impulse is still detected comprises determining a duration of the acceleration impulse is greater than the time delay.

18. The method of claim 15, wherein the step of detecting, by the at least one acceleration sensor, the acceleration impulse, comprises the acceleration sensor being actuated from a non-conducting condition to a conducting condition by acceleration greater than a predetermined magnitude threshold.

19. The method of claim 15, wherein the step of triggering the at least one safety response device comprises triggering an airbag to inflate or causes an electrically ignited pyrotechnic charge to fire.

* * * * *